July 25, 1944.  T. W. STEDMAN  2,354,436
SEAT CUSHION CONSTRUCTION
Filed Aug. 20, 1941  3 Sheets-Sheet 1

Inventor
Theodore W. Stedman
By Ely & Frye
Attorneys

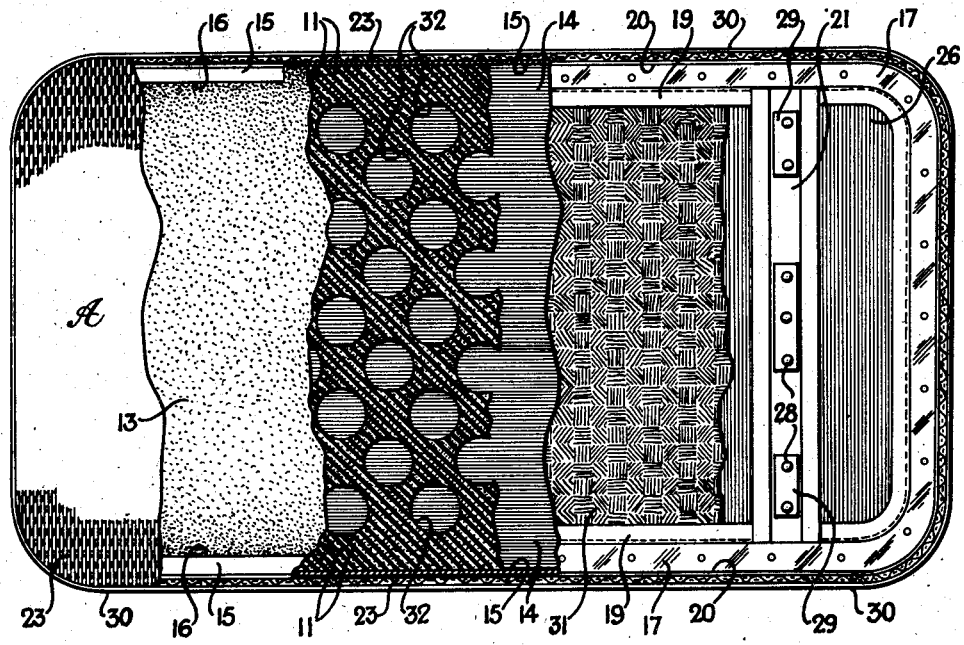
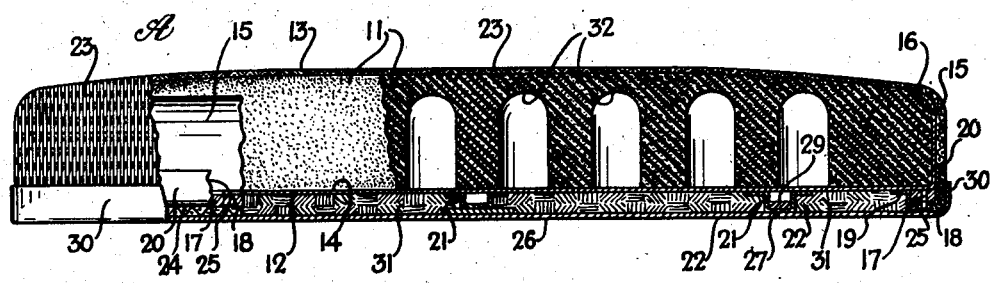

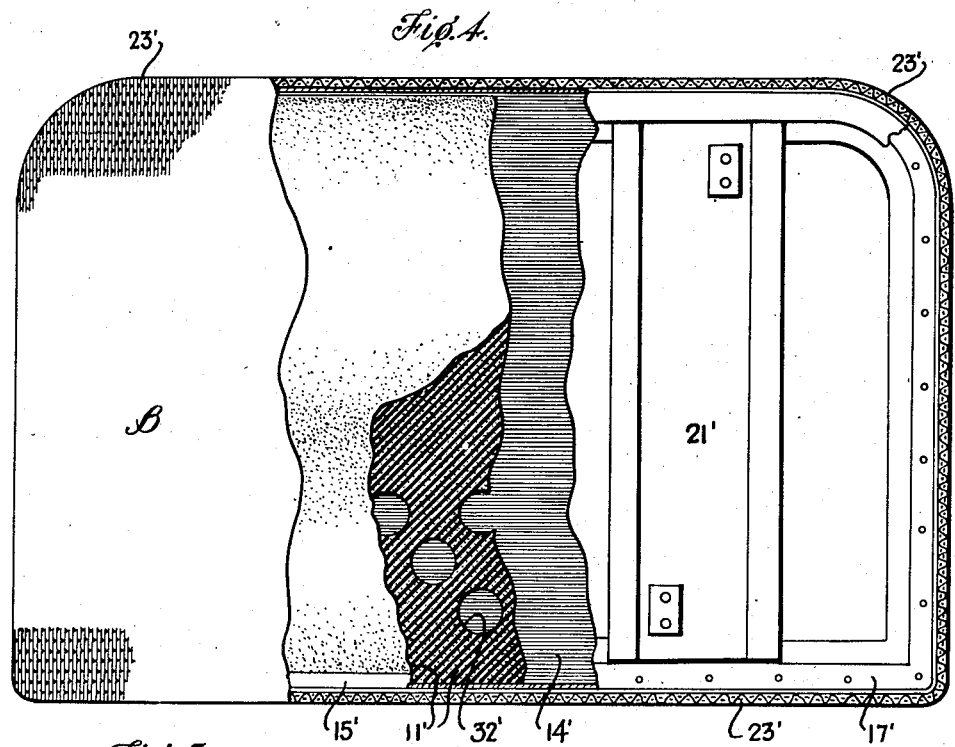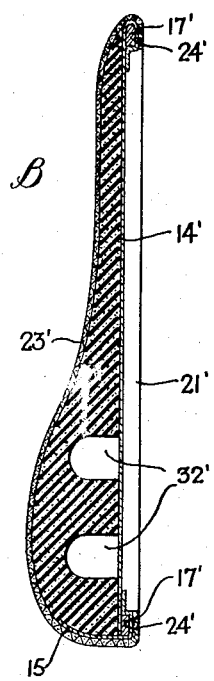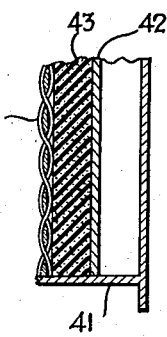

Patented July 25, 1944

2,354,436

UNITED STATES PATENT OFFICE 2,354,436

SEAT CUSHION CONSTRUCTION

Theodore W. Stedman, New York, N. Y., assignor to The Firestone Tire & Rubber Company, Akron, Ohio, a corporation of Ohio Application August 20, 1941, Serial No. 407,633

7 Claims. (Cl. 155—179)

This invention relates to improvements in cushioning structures for seats, and more especially for seats of passenger vehicles and conveyances, seating for public waiting rooms and assembly halls, and like seating equipment. This application is a continuation-in-part of my copending application, Serial No. 323,917, filed March 14, 1940.

This invention has for an object to provide novel seat cushioning structures comprising a highly resilient cushion body combined with a directly superposed interstitial and pliably responsive external covering fabric of novel characteristics.

The invention has for another object to provide a novel seat cushioning structure comprising a resilient cushion body of cellular latex directly covered with an interstitial and pliably responsive covering fabric of novel characteristics combined with a supporting means including heat insulation adapted to shield said cushion body against deteriorating effects of heat, whereby the useful life of the latter is greatly prolonged.

Another object of this invention is to provide a seat cushioning structure which is so constructed that alternate compression and expansion of the cushion body thereof incident to its use effects what may be termed an automatic breathing action through its external covering fabric which not only assures desirable internal ventilation, but also acts to automatically discharge dust and other forms of loose dirt, thus rendering the cushioning structure substantially self-cleaning so as to prevent undesirable collection and accumulation of dust and dirt thereby.

A still further object of this invention is to provide in seat cushioning structures having the above stated characteristics, a comparatively light weight, pliable external woven covering fabric, the weave of which forms a multiplicity of freely open, unfilled interstices throughout its area, so that said fabric is efficiently air pervious; which fabric is composed of interwoven strands of a non-inflammable, highly flexible and non-absorptive hardened plastic compound comprising a basic co-polymeric resin and a plasticizer, and which may include desired coloring pigment, dyes or other coloring matter.

Another object is to devise a seat cushion construction comprising the combination of a light density, resilient cushion material, capable of being easily deformed locally with a plastic woven fabric covering material composed of mono-filament yarns, strands, or strips, which are pliable, non-splintering, tough, non-porous, and having a high tensile strength and high fatigue limit.

Another object is to devise a seat cushion construction comprising the combination of a light density, resilient cushion material, capable of being easily deformed locally with a plastic woven fabric covering material woven from mono-filament plastic yarns, strands, or strips, said fabric being resiliently flexible, non-stretchable, non-inflammable, durable, abrasion resistant, moisture and acid proof, unaffected by dry cleaning solvents, porous, interstitial, bright, and lustrous.

An additional object is to devise a novel seat construction comprising a combination of a cushion material as described above with a covering material of fabric woven from mono-filament strands or strips having one concave surface and one convex surface.

Another object is to provide a novel seat cushion structure comprising the combination of a light density, resilient cushion with a covering of fabric material woven from mono-filament yarns, strands, or strips composed of one of the group of polymers and conjoint polymers derived from the polymerization of vinylidene chloride, either alone or conjointly with one or more polymerizable vinyl compounds.

An additional object is to devise a seat cushion construction comprising the combination of a light density, resilient cushion material, capable of being easily deformed locally with a plastic woven fabric covering material woven from mono-filament yarns, strands, or strips of extruded, oriented, plastic material derived from the polymerization of vinylidene chloride, either alone or conjointly with one or more polymerizable vinyl compounds.

Such covering fabric is non-inflammable, non-splintering and moisture and acid proof, while at the same time being highly resistant to abrasive, cutting or like effects, whereby it is very durable, resistant to destruction, and greatly resistant to either willful or accidental injury. By reason of its moisture and acid proof characteristics, such novel covering fabric is readily subject to thorough cleansing with water and various cleaning compounds or solutions without risk of injury thereto. Furthermore, by reason of the ability to incorporate, in the material of which it is composed, coloring matter of any desired color, the novel fabric is easily subject to production in selected solid or variegated colors, to the enhancement of the appearance and attractiveness of the seating equipment with which the novel cushioning structure including the same is employed.

Other objects of this invention, not at this time more particularly enumerated, will be understood from the following detailed description of the same.

Illustrative embodiments of this invention are shown in the accompanying drawings, in which:

Fig. 2 is a plan and in part horizontal sectional view of a seat cushioning structure according to this invention, with parts successively broken away to show underlying elements thereof; and Fig. 3 is a side elevational and in part vertical longitudinal sectional view of the same, with parts successively broken away to show its internal makeup.

Fig. 4 is a front elevational and in part sectional view of a back cushioning structure according to this invention, with parts successively broken away to show underlying elements thereof; and Fig. 5 is a vertical longitudinal sectional view of the same.

Fig. 8 is an enlarged scale cross-sectional detail of a fabric strand of concavo-convex section; and Fig. 9 is a cross-sectional detail of a plastic fabric covered cushioning material embodying the invention, as applied to an automobile body inside side panelling.

Similar characters of reference are employed in the above described views, to indicate corresponding parts.

Figure 6:
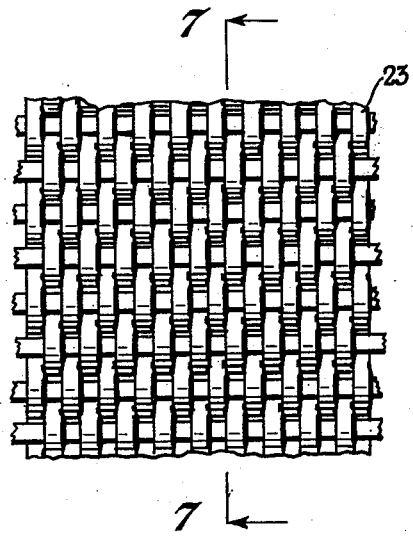
Fig. 6 is a fragmentary plan view of the covering fabric of the cushioning structures.

In the drawings, the reference character 10 is a seat frame having a seat cushion A and a back cushion B suitably mounted and attached thereto, said cushions A and B comprising cushioning structures embodying the principles and novel features of this invention.

The seat cushion A, in a preferred form thereof as shown, comprises a resilient cushion body 11, the same being made of an elastically yieldable material such e. g. as cellular latex rubber composition, or of natural or synthetic rubber of either porous or solid form. Said cushion body 11 is shaped to conform to the outline shape and height or thickness of seat cushion desired, and is provided with a flat bottom face 12 and suitable domed top surface 13.

The cushion body 11 is supported upon an imperforate inner bottom plate 14, which is preferably made of sheet metal, having, either as an integral part thereof or provided in suitably connected relation thereto, an upstanding peripheral keeper flange 15 to contiguously embrace and support the peripheral sides of the cushion body 11. Said cushion body side supporting or keeper flange 15 is shaped to conform to the contours of the cushion body sides to which it is contiguous, and is provided along its upper free edge with a non-cutting rolled marginal bead 16.

Applied to the underside of said inner bottom plate 14, to extend along and around the marginal portions thereof, is a tacking strip 17 of suitable width and thickness. This tacking strip 17 is held in place by a jacketing member 18 applied over and around the same. Said jacketing member 18 is made of sheet metal and is provided with inner anchoring flanges 19 contiguous to the underside of said inner bottom plate 14 and outer anchoring flanges 20 contiguous to the outer face of the keeper flange 15. Said anchoring flanges 19 and 20 are suitably secured to said inner bottom plate 14 and its keeper flange 15, preferably by welding.

Said inner bottom plate 14 is suitably reenforced and stiffened against distortion by a plurality of cross slats 21 applied to the underside thereof. These cross slats are also preferably made of sheet metal and provided with side flanges 22 by which they are secured to the underside of said inner bottom plate 14 in any suitable manner, but preferably by welding the same thereto.

Applied directly upon and over the cushion body 11 is a covering fabric 23 of novel characteristics. This covering fabric is made of suitably interwoven solid strands or strips of a highly flexible but nevertheless hard, tough, non-stretchable, non-absorptive and non-inflammable plastic compound comprising a basic co-polymeric resin and a plasticizer, to which may be added such coloring matter as may be selected for desired color appearance. The strands or strips of such plastic material are produced by extruding the material through suitable dies, and the flexible, tough character thereof is attained by stretching the thus produced strands or strips to approximately the elastic limits of the material, whereby a resultant rearrangement of the fibrous crystalline structure of the material is such as to render the same non-stretchable, while yet imparting thereto the desired pliability or flexibility. The solid strands or strips thus produced are non-splintering.

Due to the highly flexible character of the strands or strips of plastic material, when the same are suitably interwoven, the resultant fabric is extremely pliable, and consequently will readily conform itself to the contours of the cushion body 11 over which it is applied, both as to the normal conformation of the latter as well as to its various conformations when under compression.

Owing to the hard and homogeneous, solid, and yet flexible character of the strands or strips of plastic material, when the same are interwoven, the resultant fabric requires neither backing material, such as canvas or the like, or external coating of protective varnish, lacquer or like coating material, and consequently the interstices intermediate the interwoven strands or strips are not stopped or choked, but remain freely open so that said fabric is efficiently pervious to air. Being thus readily pervious to air, when said novel pliable fabric is overlaid in direct contact with the cushion body 11, an automatic breathing action therethrough incident to expansion and compression movements of the latter is assured, which is operative to effect both discharge of dust and dirt tending to accumulate therein as well as to induce efficient internal ventilation of said cushion body per se.

When applied over the cushion body 11, the covering fabric 23 is carried down over and around the sides thereof, externally of said keeper flanges 15, with its marginal portions 24 turned around and beneath the tacking strip 17. Said marginal portions 24 are secured to said tacking strip 17 by any suitable form of fastening means, as e. g. by means of self-tapping fastening screws 25 which are passed through said marginal portions 24, and thence through passage openings provided therefor in the jacketing member 18, to screw into the body of said tacking strip.

An imperforate outer bottom plate 26 is provided to extend in parallel spaced relation to said inner bottom plate 14, the same being secured in place by attachment to said cross slats 21 by suitable means, such e. g. as fastening screws 27 which screw into the threaded openings 28 of anchor plates 29 which are affixed in suitable locations to said cross slats 21, as e. g. by welding thereto. Said bottom plate 26 is provided with an upstanding side flashing flange 30 around its periphery to externally embrace and protect the secured marginal portions of the covering fabric.

Filled into the space intermediate the inner and outer bottom plates 14 and 26 is a suitable heat insulating material 31, such e. g. as asbestos fibre or any other suitable material of poor heat conductive characteristics.

The seat cushion A is applied and detachably secured in any suitable manner to the seat portion of the seat frame 10. In seating equipment of passenger vehicles, especially for railway and like passenger cars, the devices for heating the vehicle interior are usually installed beneath the seats. As a consequence of this the seat cushions are exposed to the radiated heat, which, when the cushioning structure includes perforate bottom frames for ventilation, heretofore in common use, permits such radiated heat to penetrate and play more or less directly upon the internal cushion bodies thereof, which, if made of rubber or like material, as is frequently the case, has a deleterious effect upon such cushion bodies, tending to quickly induce oxidation thereof and consequent comparatively rapid disintegration which greatly reduces the useful life period thereof. These objectionable effects are overcome in the cushioning structure of this invention, since by reason of the ability thereof to breathe through the novel air pervious covering fabric, and thereby to assure desired internal ventilation, the bottom frame may not only be made imperforate but may also include the protective heat insulating medium described. As a result the latex or like cushion body is effectively shielded against the deleterious effects of heat, and consequently its useful life period is greatly extended, and in fact may be said to be indefinite.

In order to increase the resiliency of the cushion body 11, and to enhance its breathing function under its compression and expansion reactions, the mass thereof may be provided with a plurality of suitably distributed and spaced hollow chambers or air cells 32, the closed ends of which terminate short of the top surface thereof.

The back cushion B, where required, comprises substantially the same general make up above described with respect to the seat cushion A, except that, where not exposed to direct heat radiation, the double insulated bottom structure of its frame may be, if desired, omitted.

In the illustrative form of back cushion B shown in the accompanying drawings, the same comprises a cushion body 11' of latex composition or the like. Said cushion body 11' is suitably shaped to provide desired back rest contours. The cushion body 11' is supported upon an imperforate back or bottom plate 14', having the suitably disposed peripheral keeper flange 15'. Secured to the marginal portions of the back or bottom plate 14' is the jacketed tacking strip 17'. The back or bottom plate 14' is likewise provided with reinforcing or stiffening cross slats 21', which are welded or otherwise secured thereto. Applied directly upon and over the cushion body 11' is an interstitial and therefore air pervious covering fabric 23' made of interwoven strands or strips of plastic material having the novel characteristics and advantages already above described. The marginal portions 24' of the covering fabric are suitably secured to the tacking strip 17'. The cushion body 11' may be provided with a plurality of suitably located and spaced hollow chambers or air cells 32'.

It will be obvious that the back cushion B as thus constituted will possess all the functional advantages already referred to in the description of the seat cushion A, and especially the breathing, ventilating and self-cleaning functions inherent in the directly associated cushion body and interstitial covering fabric of plastic material.

The back cushion B is applied and detachably secured in any suitable manner to the back portion of the seat frame 10. Since said back portion of the seat frame 10 is not exposed to direct heat radiation, an exterior back or bottom plate and associated insulation medium described in connection with the seat cushion A is omitted. It will be understood, however, that where the back cushion B is utilized in installations exposed to heat radiation, such omitted elements would be provided.

The fabric covering material may be transparent, translucent, or opaque, and may be woven with any suitable weave, such as an open or close weave, box weave, basket weave, or weaves having twill, satin, and Jacquard woven figured effects. The mono-filaments, strips or strands may be glossy and smooth to make the fabric more readily locally deformable in cooperation with an underlying locally deformable cushion. It will be appreciated that multi-filament yarns, etc., may be made from filaments produced in accordance with the teachings hereof, when desired.

Fabrics woven from the coarser strips or strands are particularly applicable to furniture upholstering and transportation seating where it takes the place of reed, rattan, cane and split bamboo materials formerly used in which case the surface of the strands may be slightly ridged or corrugated to simulate the natural product. In this application, owing to the unlimited weaving and coloring effects, the use of this novel fabric is especially advantageous. Either simple, one color, or more elaborate multi-color designs are readily produced in weaving, making material available for unusual, decorative, and aesthetic effects. The coarser woven material may be effectively utilized as a covering material for a thin layer of cushioning material for the inside side panels of automobiles, as illustrated in Fig. 9, where its durability, attractive appearance, resistance to abrasion, and waterproof characteristics are especially advantageous. A metal member 41, which is a fragment of an automobile body, is shown in Fig. 9. The member 41 has a vertically directed section 42 associated therewith, which section has a sheet of porous rubber 43 covering the inner surface thereof with the rubber 43 being covered, in turn, by a woven plastic fabric 44 that may be similar to the fabric 23. The fabric 44 may be cemented or otherwise suitably secured to the rubber 43. Both the plastic fabric and the rubber 43 may terminate at, and be secured to, if desired, the member 41, the outer portion of which forms part of the outer surface of an automobile body.

A similar construction may be applied to the inside side panelling of passenger airplane bodies.

The special type of fabric and material from which it is manufactured, and which cooperates with the cushioning material to form a new combination for the cushioning structure are described below.

First referring to the prior art, plastic fabrics have been manufactured heretofore, but none of the prior art fabric structures or materials have achieved the combinations and characteristics which are claimed herein, nor have they achieved any of the desirable results to the degree attained in the novel fabric disclosed herein.

Substances such as synthetic fiber-forming linear condensation polyamides (commercially known as "nylon"), co-polymers of vinyl chloride with vinyl acetate (commercially known as "Vinylite" or "Vinyon"), cellulose nitrate with camphor or other suitable plasticizer (commercially known as "Celluloid"), cellulose acetate (commercially known as "Tenite"), polymethyl methacrylate (commercially known as "Lucite"), are plastic materials which may have been used heretofore for making woven fabrics. None of these, however, are suitable for the purposes for which the present novel fabric may be employed, due to brittleness, lack of tensile strength, non-ductility, water absorption, solubility, low flex life, inflammability, or stretch.

The class of materials employed in the manufacture of the novel fabric seat covering material claimed herein are polymeric or co-polymeric resins in combination with suitable plasticizers and/or stabilizers, with which may be incorporated suitable coloring pigments, dyes, or other coloring material, as desired. In its specific aspects, the preferred material is derived from the polymerization of vinylidene chloride either alone or conjointly with one or more compounds selected from a group which consists of the vinyl halides (of which vinyl chloride is typical), the lower aliphatic esters of vinyl alcohol (of which vinyl acetate is typical), the lower aliphatic esters of methacrylic and acrylic acids (of which methyl methacrylate and ethyl acrylate are typical), and styrene together with its nuclear substituted chlorine derivatives (of which styrene and meta chlorstyrene are typical).

To make the material more readily extrudable and ductile, suitable plasticizers and/or stabilizers are added as well known in the art of vinylidene chloride plastics. The material is then extruded through a die to the desired cross sectional contour, as heretofore described, and is then drawn by elongating the extruded strip, while still in a plastic state, to reduce the cross sectional dimension to the desired size. This drawing action results in an orientation of the fibers or crystals of the material. As distinguished from other common plastics, vinylidene chloride possesses a degree of fibrous crystallinity. Normally, these crystals lie in a random, heterogeneous arrangement. Partially by the extrusion, and more completely by the drawing and orientation, the fibrous crystals are re-aligned in an orderly linear pattern. When such an extruded, oriented plastic strand is stressed, each crystal theoretically assumes its share of the load and the more desirable physical properties enumerated in the objects above are attained. Even large size filaments may thus be produced, having a tensile strength of 60,000 lbs. per sq. in., as well as having great flex life and high fatigue limit. The strands or strips of mono-filaments, so manufactured, are pliable, non-splintering, tough, and non-porous.

After extrusion and orientation the filament is allowed to cool and harden and is ready for weaving. The weaving of coarse strips or strands may be carried out on ordinary cane or rattan looms. Wetting of the strands to promote flexibility is avoided, since the material is sufficiently pliable in its natural state, as distinguished from rattan, which must be moistened to render it sufficiently pliable for weaving. However, the strands are non-shrinkable so that water does not injure them in any manner.

Figure 7:
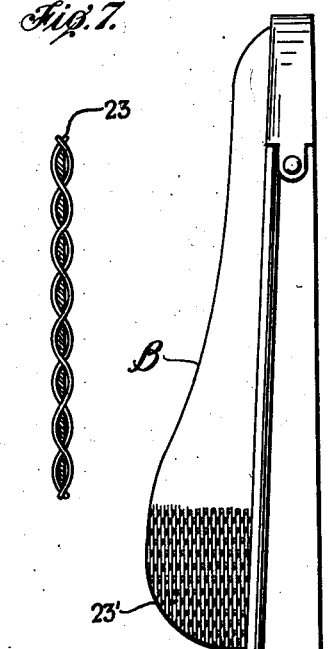
Fig. 7 is a sectional view therethrough, taken on line 7—7 in said Fig. 6.
Figure 1:
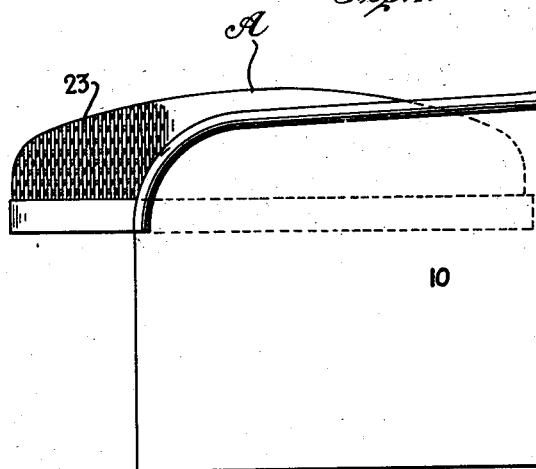
Fig. 1 is a side elevation of a seat frame furnished with cushioning structures made according to this invention.

The mono-filament strips or strands may have a plano-convex-cross section, as illustrated in Fig. 7 of the drawings. In order to make the fabric more resiliently flexible, however, it is preferred that the cross section of the strands forming the fabric 23 may be made concavo-convex, as illustrated by strand 23ª in Fig. 8.

When such yarns, strands, or strips are woven, they produce a fabric which is resiliently flexible, non-stretchable, non-inflammable, durable, abrasion resistant, moisture and acid proof, unaffected by dry cleaning solvents, porous, bright and lustrous. The weave of the material is such that a multiplicity of freely open unfilled interstices are produced throughout its area, so that the fabric is efficiently air pervious, a property which is highly desirable in the manufacture of seat cushion coverings and furniture upholstery. An important characteristic of the extruded oriented yarns, strips or strands, and the fabric into which they are woven is that they are unaffected by all ordinary atmospheric temperature changes, becoming neither too brittle when cold nor too plastic and stretchable when hot. Also, the yarns, etc., are poor heat conductors.

In some cases, the woven plastic fabric may be secured over or to a thin layer of porous rubber or other cushioning material to form the outer portion of a cushion which primarily may comprise springs or other cushioning elements.

From the above description it will be apparent that this invention provides very efficient and long lived seat cushioning structures, wherein, in addition to the functional advantages incident to the novel covering fabric of plastic material, ornamental color characteristics may be easily attained in connection therewith to the enhancement of the appearance and details of the novel seat cushioning structures, without departing from the scope of this invention as defined by the following claims. It is therefore intended that the constructions shown and described are to be interpreted as illustrative and not in a limiting sense.

What is claimed is:

1. In a seat cushioning structure, the combination of a readily deformable, resilient cushion body, and a pliable air-pervious covering fabric composed of interwoven mono-filament yarns, strands, or strips, which are pliable, tough, non-splintering, non-porous, non-stretchable, non-inflammable plastic material comprising a vinylidene chloride polymer having a high tensile strength and high fatigue limit, said covering fabric being readily deformable locally, and being disposed in overlying relation to the operative face of said cushion body, whereby the covering allows full utilization of the ready deformability and resilience of the cushion body in affording seating comfort and non-setting structure.

2. In a seat cushioning structure, the combination of a readily deformable, resilient cushion body, and a pliable air-pervious covering fabric composed of interwoven resiliently flexible but non-stretchable and non-splintering strands of non-inflammable plastic material comprising a vinylidene chloride polymer, said covering fabric being readily deformable locally, durable, abrasion resistant, moisture and acid proof, unaffected by dry cleaning solvents, porous, interstitial, bright, and lustrous, said fabric being disposed in overlying relation to the operative face of said cushion body, whereby the additive effects of ready deformability and resilience of the cushion body and of the covering fabric cooperate in affording seating comfort and non-setting structure.

3. In a seat cushioning structure, the combination of a readily deformable, resilient cushion body, and a pliable air-pervious covering fabric composed of interwoven mono-filament yarns, strands, or strips, which are pliable, tough, non-splintering, non-porous, non-stretchable, non-inflammable plastic material having a high tensile strength and high fatigue limit, said material comprising one of the group of polymers and conjoint polymers derived from the polymerization of vinylidene chloride, said covering fabric being readily deformable locally, and being disposed in overlying relation to the operative face of said cushion body, whereby the covering fabric allows full utilization of the ready deformability and resilience of the cushion body in affording seating comfort and non-setting structure.

4. A seat cushioning structure comprising, in combination, a resilient cushion body which is readily deformable locally, and a pliable air-pervious covering fabric adapted to conform readily to locally deformed portions of said cushion under compressive stress and readily to return to its normal shape upon being relieved of such stress, said covering fabric being composed of woven mono-filament yarns, strips or strands of a polymerization product including a vinylidene chloride polymer.

5. An upholstery construction comprising in combination, a readily deformable resilient cushion body and a readily deformable resilient plastic fabric covering disposed on the operative face of said cushion body, permitting utilization of the ready deformability and resilience of said cushion body, said fabric being woven of mono-filament yarns, strands or strips composed of a polymerization product including a vinylidene chloride polymer.

6. In combination a readily deformable resilient cushion body and a readily deformable resilient plastic fabric covering disposed on the operative face of said cushion body, said fabric being woven of mono-filament yarns, strands or strips comprising essentially one of the group of polymers and conjoint polymers consisting of a polymer of vinylidene chloride and a co-polymer of vinylidene chloride and another polymerizable vinyl compound.

7. In combination a readily deformable resilient cushion body and a readily deformable resilient plastic fabric covering disposed on the operative face of said cushion body, said fabric being woven from yarns, strands or strips of extruded, oriented, plastic material essentially composed of one of the group consisting of a polymer of vinylidene chloride and a co-polymer of vinylidene chloride and another polymerizable vinyl compound.

THEODORE W. STEDMAN.